US008068815B2

(12) United States Patent
Lakkala

(10) Patent No.: US 8,068,815 B2
(45) Date of Patent: Nov. 29, 2011

(54) SUBSCRIBER TERMINAL FOR A RADIO SYSTEM AND AN ARRANGEMENT, A METHOD AND A COMPUTER PROGRAM FOR PRESENTING CONTACT ATTEMPTS TO A SUBSCRIBER TERMINAL OF A RADIO SYSTEM

(75) Inventor: Harri Lakkala, Tampere (FI)

(73) Assignee: Nokia Corporation, Espoo (FI)

( * ) Notice: Subject to any disclaimer, the term of this patent is extended or adjusted under 35 U.S.C. 154(b) by 49 days.

(21) Appl. No.: 10/624,166

(22) Filed: Jul. 21, 2003

(65) Prior Publication Data

US 2005/0020247 A1    Jan. 27, 2005

(51) Int. Cl.
*H04M 1/725* (2006.01)
(52) U.S. Cl. .......... 455/412.2; 455/412.1; 455/466; 455/567
(58) Field of Classification Search .... 455/412.1–412.2, 455/413, 414.1, 415, 566, 567, 466
See application file for complete search history.

(56) References Cited

U.S. PATENT DOCUMENTS

| | | | | |
|---|---|---|---|---|
| 6,516,202 | B1* | 2/2003 | Hawkins et al. | 455/556.2 |
| 6,529,737 | B1* | 3/2003 | Skinner et al. | 455/466 |
| 6,674,448 | B1* | 1/2004 | Garahi et al. | 715/719 |
| 6,741,678 | B2* | 5/2004 | Cannell et al. | 379/88.14 |
| 7,212,808 | B2* | 5/2007 | Engstrom et al. | 455/412.1 |
| 7,296,241 | B2* | 11/2007 | Oshiro et al. | 715/778 |
| 7,493,381 | B2* | 2/2009 | Garg | 709/223 |
| 2003/0100295 | A1* | 5/2003 | Sakai et al. | 455/415 |
| 2003/0176205 | A1* | 9/2003 | Oota et al. | 455/567 |
| 2004/0203977 | A1* | 10/2004 | Kennedy | 455/550.1 |
| 2004/0242284 | A1* | 12/2004 | Sierawski et al. | 455/567 |
| 2005/0085274 | A1* | 4/2005 | Lee | 455/566 |
| 2006/0129643 | A1* | 6/2006 | Nielson et al. | 709/206 |
| 2007/0133771 | A1* | 6/2007 | Stifelman et al. | 379/142.01 |
| 2007/0280457 | A1* | 12/2007 | Aberethy et al. | 379/201.01 |
| 2008/0057926 | A1* | 3/2008 | Forstall et al. | 455/415 |

FOREIGN PATENT DOCUMENTS

WO    WO 0128192 A1 *   4/2001

* cited by examiner

*Primary Examiner* — Anthony Addy
(74) *Attorney, Agent, or Firm* — Hollingsworth & Funk, LLC

(57) ABSTRACT

A subscriber terminal for a radio system and an arrangement, a method and a computer program for presenting contact attempts to a subscriber terminal of a radio system are disclosed. The subscriber terminal includes: a transceiver configured to receive calls and messages; a control unit connected to the transceiver configured to save unanswered call data and messages relating to unanswered calls, and to constitute contact attempts from the unanswered call data and the messages relating to the unanswered calls; and a user interface connected to the control unit configured to present the contact attempts.

25 Claims, 2 Drawing Sheets

SUBSCRIBER TERMINAL FOR A RADIO SYSTEM AND AN ARRANGEMENT, A METHOD AND A COMPUTER PROGRAM FOR PRESENTING CONTACT ATTEMPTS TO A SUBSCRIBER TERMINAL OF A RADIO SYSTEM

FIELD

The invention relates to a subscriber terminal for a radio system, an arrangement for presenting contact attempts to a subscriber terminal of a radio system, a method for presenting contact attempts to a subscriber terminal of a radio system, and a computer program for presenting contact attempts to a subscriber terminal of a radio system.

BACKGROUND

Calling other people to communicate is natural to us nowadays. Even so, problems arise when we try to call somebody and the call is not answered. Usually the person we tried to contact checks his mobile phone later and notices our contact attempt. He will then normally call back to ask why he was called. This is not always what we wish. We do not always want the other person to call back to us, for example if we called the wrong person or we already got the information we wanted from somewhere else.

Currently the most natural way to let the other person know why we tried to call him is to send him an SMS (Short Message Service) message. With the current mobile phones, attaching messages to unanswered calls is cumbersome. The message is not combined with the call at the receiving end, because SMS messages cannot be associated with a particular call attempt. This can easily lead to unnecessary calls back to ask the reason for the call. Contact attempts are also shown in an unintuitive way; we are shown the number of missed calls and unread messages rather than who has tried to contact us. If a person has both called us and sent us an SMS message stating the reason for his call we may check the missed calls first and call the person before reading the message he has sent.

BRIEF DESCRIPTIONS OF THE INVENTION

The present invention seeks to provide an improved subscriber terminal for a radio system, an improved arrangement for presenting contact attempts to a subscriber terminal of a radio system, and an improved method for presenting contact attempts to a subscriber terminal of a radio system.

According to an aspect of the present invention, there is provided a subscriber terminal for a radio system, comprising: a transceiver configured to receive calls and messages; a control unit connected to the transceiver configured to save unanswered call data and messages relating to unanswered calls, and to constitute contact attempts from the unanswered call data and the messages relating to the unanswered calls; and a user interface connected to the control unit configured to present the contact attempts.

According to another aspect of the present invention, there is provided an arrangement for presenting contact attempts to a subscriber terminal of a radio system, comprising: receiving means for receiving calls and messages; saving means for saving unanswered call data and messages relating to unanswered calls; constituting means for constituting contact attempts from the unanswered call data and the messages relating to the unanswered calls; and presenting means for presenting the contact attempts.

According to another aspect of the present invention, there is provided a method for presenting contact attempts to a subscriber terminal of a radio system, comprising: receiving calls and messages; saving unanswered call data and messages relating to unanswered calls; constituting contact attempts from the unanswered call data and the messages relating to the unanswered calls; and presenting the contact attempts.

According to another aspect of the present invention, there is provided a computer program distribution medium readable by a computer and encoding a computer program of instructions for executing a computer process for presenting contact attempts to a subscriber terminal of a radio system, the process comprising: saving unanswered call data and messages relating to unanswered calls; constituting contact attempts from the unanswered call data and the messages relating to the unanswered calls; and presenting the contact attempts with a user interface of the subscriber terminal.

The present invention provides several advantages. The invention makes it easier to inform the other person on the reason for the call and on whether he should call back or not. Users that have unanswered calls will see them more naturally as contact attempts which can have messages related to them that are shown to the user. This eliminates the possibility of call-related messages not being noticed when viewing missed calls and received messages.

LIST OF DRAWINGS

In the following, the invention will be described in greater detail with reference to the embodiments and the accompanying drawings, in which FIG. 1 shows an example of the appearance of a subscriber terminal;

DESCRIPTION OF EMBODIMENTS

Figure 1:
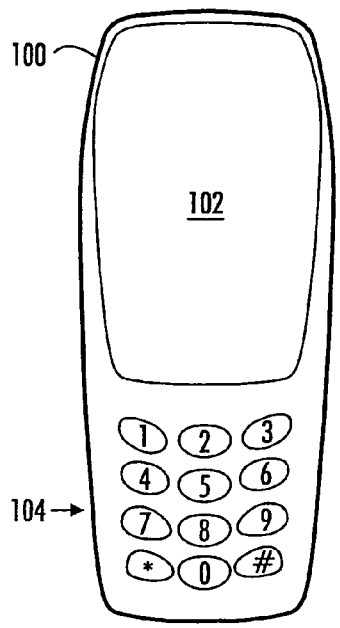

An example of the appearance of a subscriber terminal for a radio system will be described with reference to FIG. 1. The subscriber terminal may also combine different functions, i.e. it may be a combination of a subscriber terminal and a PDA (Personal Digital Assistant), for example. An example of this kind of combined device is the Nokia® Communicator®. In the example of FIG. 1, a subscriber terminal 100 comprises a display 102 and a keyboard 104. Also other technologies known in the art can be used for implementing the user interface. Such technologies include a touch screen, wherein a touch pad is integrated with a display, and thus the keyboard can be shown on the display.

Figure 2:
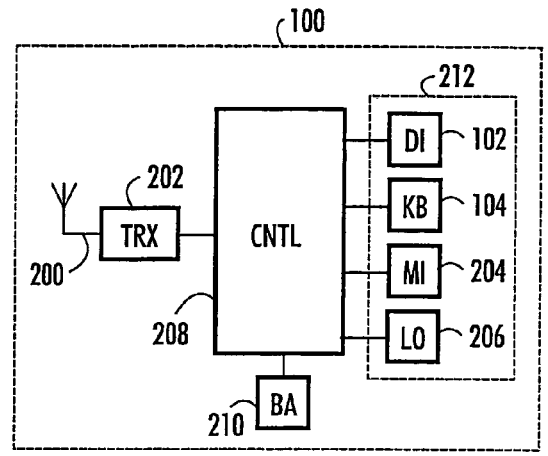
FIG. 2 is a simplified block diagram illustrating parts of a typical subscriber terminal.

Next, the structure of the subscriber terminal will be described with reference to FIG. 2. The subscriber terminal 100 comprises an antenna 200 and a radio transceiver 202. The radio transceiver 202 is e.g. a prior art transceiver of a mobile station which functions in the GSM system (Global System for Mobile Communications), GPRS system (General Packet Radio Service) or in the UMTS system (Universal Mobile Telecommunications System), for instance. In addition to the above-mentioned keyboard 104 and display 102 for implementing a user interface 212, a typical subscriber terminal 100 comprises a microphone 204 and a loudspeaker 206 for processing sound. A chargeable battery 210 usually functions as the power source.

The subscriber terminal 100 further comprises a control unit 208, which controls and monitors the operation of the subscriber terminal and its various parts. The control unit 208 also includes the application programs of the subscriber terminal 100, e.g. for radio signal processing and user interface 212 management. Nowadays the control unit 208 is usually implemented as a processor and its software but various hardware solutions are also feasible, such as a circuit built from separate logic components or one or more application-specific integrated circuits (ASIC). If necessary, there may be more than one processor. A hybrid of these solutions is also feasible. In the selection of the implementation method a person skilled in the art will naturally consider the requirements set on the size and power consumption of the subscriber terminal 100, the necessary processing capacity, production costs and production volumes.

The subscriber terminal 100 accordingly comprises a transceiver 202 configured to receive calls and messages, a control unit 208 connected to the transceiver 202, and a user interface 212 connected to the control unit 208.

Next, with reference to FIGS. 3A, 3B, 3C and 4 it is explained how contact attempts are created and presented. A person with his subscriber terminal 400 tries to call somebody but the call is not answered. He knows that the person he called will call him back later to ask what the reason for the call was, which would be unnecessary by then. He therefore sends a message to the person he called, explaining the situation. He can do this normally by sending an SMS message, for example. The call and the message are transmitted in a radio connection 402 between the caller's subscriber terminal 400 and communication network 404. In an embodiment the message comprises a text message, for example an SMS message. The advantage of the text message is that as it contains digital alphanumeric information, its automatic processing is easy to implement. The message is not, however, limited to this type of message, but it can be any message, packet-switched or circuit-switched, that is suitable for conveying information of the described kind in a radio system from the caller to the person being called. Such messages include MMS (Multimedia Message Service) messages, voice messages, video messages, image messages, but it is to be understood that the embodiments are not limited to these examples.

Figure 3A:
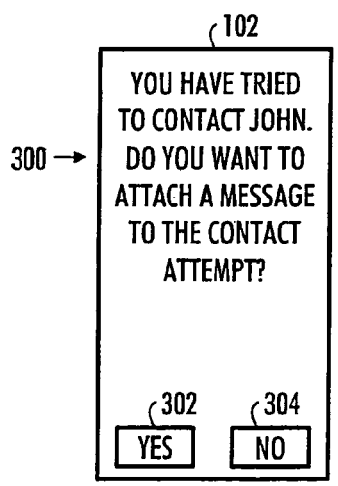
FIGS. 3A, 3B and 3C illustrate how contact attempts can be created and presented.
Figure 3B:
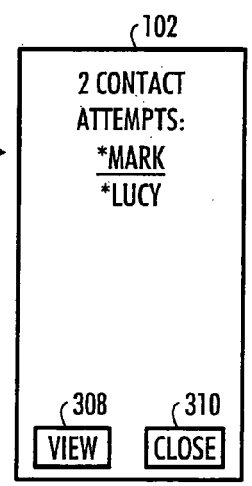

An embodiment according to FIG. 3A is also possible, wherein the subscriber terminal 400 of the caller recognizes that an unanswered call was made. Therefore the subscriber terminal 400 is able to show on the display 102 the following text 300: "You have tried to contact John. Do you want to attach a message to the contact attempt?" There are also shown two selection mechanisms 302, 304. If the selection mechanism 302 is chosen, the user will be prompted for a message, which he then can write with the keyboard 104. Another alternative is that one of the listed default messages can be chosen. The message can then be sent to the same number to which the unanswered call was made.

The person being called has had his subscriber terminal 100 in silent mode. There is a radio connection 406 between the subscriber terminal 100 and the communication network 404. The control unit 208 of the subscriber terminal 100 is configured to save unanswered call data 410 and messages 412 relating to unanswered calls, and to constitute contact attempts 414 from the unanswered call data 410 and the messages 412 relating to unanswered calls. There is also a user interface 212 connected to the control unit 208 configured to present contact attempts 414. The missed call and the received message are shown together as a contact attempt, which is a natural way to handle them.

When the person that has been called checks his subscriber terminal 100 he notices that one person has tried to contact him. According to FIG. 3B contact attempts 306 are shown on the display 102 of the subscriber terminal 100. In the pictured embodiment, the control unit 208 is configured to display in the user interface 212 the contact attempts 414 as a list 306 of contact attempts. The list 306 comprises two contact attempts. In the pictured embodiment the control unit 208 is configured to display the list 306 of contact attempts as a list of callers. In our example there are two callers: Mark and Lucy. This also pictures an embodiment where the control unit 208 is configured to fetch a name for a caller present in the contact attempts from a phonebook 416 and to display the name of the caller in the user interface 212. Also other prior art ways of presenting information can be used: the contact attempts can be presented with voice, i.e. the following is said through the loudspeaker 206: "You have one unanswered call and one message from Mark and one unanswered call from Lucy.

Figure 3C:
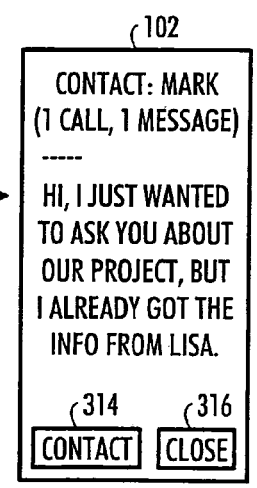

Also a selection mechanism 308, 310 is shown on the display 102. If the user selects 310, the contact attempts will be closed. If the user selects 308, then more details 312 on the highlighted contact attempt will be shown, as illustrated in FIG. 3C. In this embodiment the control unit 208 is configured to receive a selection regarding a contact attempt from the user interface 212 and to display the selected contact attempt in more detail in the user interface 212. In our example, the person that has been called selects the contact attempt relating to Mark, and according to FIG. 3C details 312 of the contact attempt are shown. Also the number of calls (one in our example) and the number of messages (one in our example) from the same caller can be shown. Also the message sent by the caller is shown on the display 102: "Hi, I just wanted to ask you about our project, but I already got the info from Lisa." In an embodiment the control unit 208 is configured to display in the user interface 212 a selection mechanism 314, which, when selected, makes a contact, such as a call or a message, to a caller of the selected contact attempt, i.e. in our example makes a call from the subscriber terminal 100 to the subscriber terminal 400. If 316 is selected, then the details 312 of the contact attempt will be closed.

In an embodiment, for the constitution of the contact attempts the control unit 208 is configured to combine together such unanswered call data and such a message relating to an unanswered call which both refer to the same caller. In an embodiment the control unit 208 is configured to find a reference to the same caller if both the unanswered call data and the message relating to the unanswered call both contain the same caller identifier, such as a mobile telephone number or any other suitable subscriber identifier.

Figure 4:
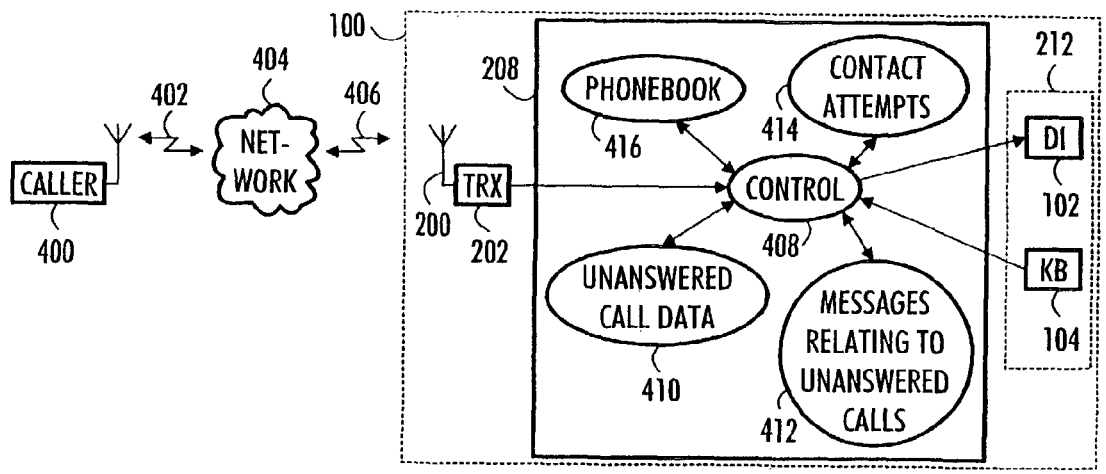
FIG. 4 illustrate how an unanswered call and a message relating to it result in a contact attempt.

FIG. 4 also illustrates a feasible structure of the control unit 208. The blocks belonging to the control unit 208 are structural entities that can be implemented e.g. as program modules, i.e. by a programming language, such as the C programming language, C++ programming language, some other computer language, or by an assembler, which are stored as runnable versions in a memory provided in the processor and run in the processor. Instead of translatable programming languages, other interpretable programming languages may naturally also be used, provided that they satisfy the required processing rate and capacity. When the control unit 208 is implemented as an ASIC, the structural entities are ASIC blocks. Block 408 denotes a general control function that implements the described functionality, and the blocks 410, 412, 414 and 416 denote memories where the needed data can be stored. The processing of the contact attempts can be implemented using SMS messages and by making changes into user interfaces of mobile phones. SMS messages can have special headers so that they are handled automatically by applications realizing the contact attempts. The user interface of the phones has to be modified to support the user interaction.

Figure 5:
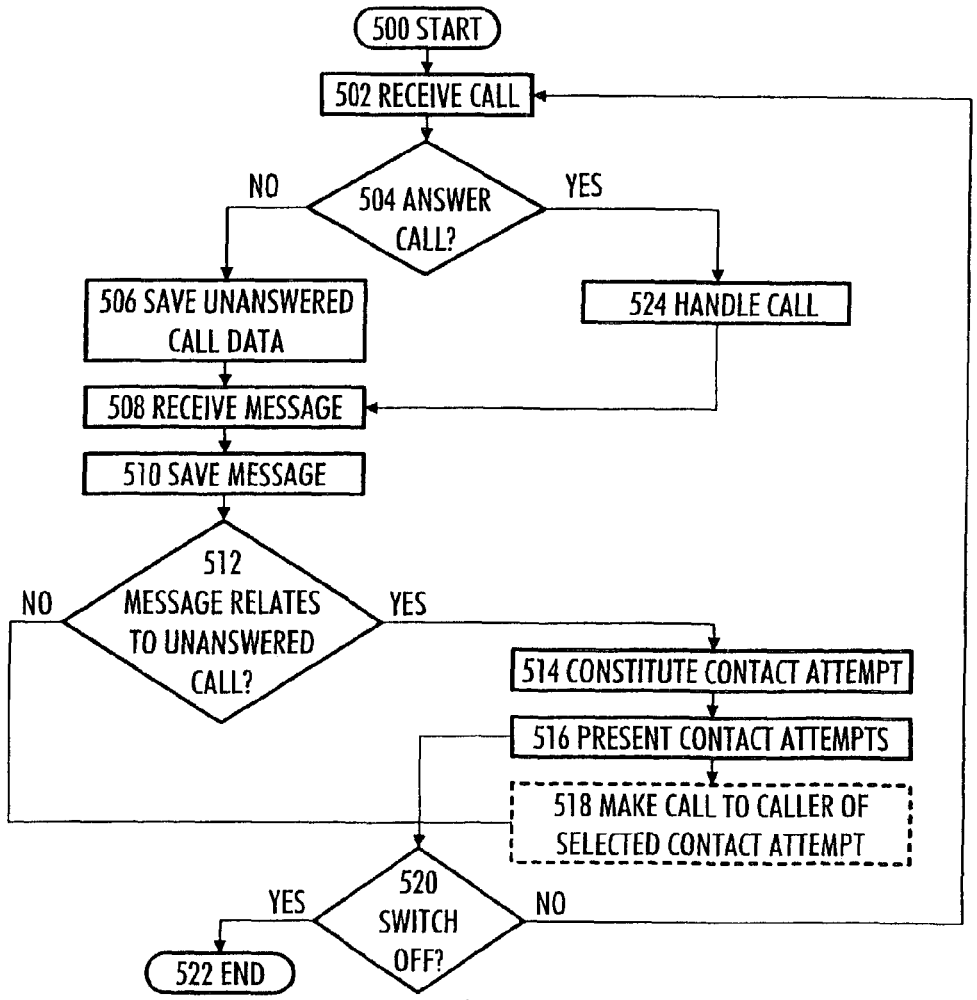
FIG. 5 is a flow diagram illustrating a method for presenting contact attempts to a subscriber terminal of a radio system.

In the following, a method for presenting contact attempts to a subscriber terminal of a radio system will be described with reference to FIG. 5. The method starts in 500, e.g. when the subscriber terminal is switched on. Then a call is received in 502. In 504 it is tested whether the user of the subscriber terminal has answered the call. If the call is unanswered, unanswered call data is saved in 506. If the call is answered, it is handled in 524.

A message is received in 508, and it is saved in 510. In an embodiment such a message is a text message, such as an SMS message, but it can also be some other message known in the art of radio systems conveying the necessary information, as was described in the foregoing example. In 512 it is tested whether the received message relates to some unanswered call. If the message does not relate to an unanswered call, 520 is entered. If the message relates to an unanswered call, a contact attempt is constituted from the unanswered call data and the message relating to the unanswered call in 514. In an embodiment the constitution of the contact attempts comprises: combining together such unanswered call data and such a message relating to an unanswered call which both refer to the same caller. In an embodiment a reference to the same caller is found if both the unanswered call data and the message relating to the unanswered call both contain the same caller identifier.

Next, contact attempts are presented in 516. In an embodiment, the contact attempts are displayed as a list of contact attempts. Such a list of contact attempts can be displayed as a list of callers. In an embodiment, a selection regarding a contact attempt is received and the selected contact attempt is then displayed in more detail. In an embodiment a name for the caller present in the contact attempts is fetched and displayed.

Optionally, a selection mechanism is displayed, which, when selected, makes a contact, such as a call or a message, to a caller of the selected contact attempt in 518.

Switching off the subscriber terminal can be tested in 520. If the subscriber terminal is switched off, 522 is entered and the method ends. If the subscriber terminal is not switched off, we move from 520 to 502. Naturally, 520 may be located at other points of the method sequence. It is also to be understood that the portrayed sequence of the actions is only one example of possible sequences: constitution of the contact attempts, for example, can be done not only after the message reception but also at other times. Such an embodiment is also feasible where the contact attempts are constituted at regular time intervals, for example. The order of actions in the sequence can therefore alter according to the preferred implementation style.

A subscriber terminal 100 described above is suitable for performing the method, but also other subscriber terminals capable of receiving calls and messages may be applicable. Even though the needed functionality is implemented in the subscriber terminal 100 in the foregoing examples, such an arrangement and a method is also possible where part of the described functionality is implemented, besides in the subscriber terminal 100, in the actual radio system 404.

In an embodiment, the control unit 208 includes a software application responsible for encoding a computer program of instructions for executing a computer process for presenting contact attempts to a subscriber terminal of a radio system. As a normal subscriber terminal already has the means for receiving calls and messages, the computer process comprises the following: saving unanswered call data and messages relating to unanswered calls; constituting contact attempts from the unanswered call data and the messages relating to unanswered calls; and presenting contact attempts with a user interface of the subscriber terminal. The software can be embodied on a computer program distribution medium readable by a computer. The distribution medium can be any known medium used for software distribution, such as a computer readable medium, a program storage medium, a record medium, a computer readable memory, a computer readable software distribution package, a computer readable signal, a computer readable telecommunications signal, and a computer readable compressed software package, for example.

Even though the invention is described above with reference to an example according to the accompanying drawings, it is clear that the invention is not restricted thereto but it can be modified in several ways within the scope of the appended claims.

The invention claimed is:

1. A subscriber terminal comprising:
a transceiver configured to receive calls and text messages;
a control unit connected to the transceiver configured to save received unanswered call data, save received text messages, wherein the control unit of the subscriber terminal is further configured to constitute a collection of both received unanswered call data and at least one saved received text message by combining together the unanswered call data and the saved received text messages, which both refer to the same caller, into a single contact attempt related to the caller, wherein content of the at least one saved received text message is descriptive of a reason for the unanswered call data, and wherein the control unit is configured to find a reference to the same caller if both the unanswered call data and the saved received text message both contain the same caller identifier; and
a user interface connected to the control unit and configured to present the single contact attempt comprising the content of the at least one saved received text message to indicate the reason for the unanswered call data.

2. The subscriber terminal of claim 1, wherein the control unit is configured to display in the user interface the single contact attempt within a list of contact attempts.

3. The subscriber terminal of claim 2, wherein the control unit is configured to display the list of contact attempts as a list of callers.

4. The subscriber terminal of claim 1, wherein the control unit is configured to receive a selection regarding the contact attempt from the user interface and to display the selected contact attempt in more detail in the user interface.

5. The subscriber terminal of claim 1, wherein the control unit is configured to fetch a name for the caller present in the contact attempt from a phonebook and to display the name of the caller in the user interface.

6. The subscriber terminal of claim 1, wherein the control unit is configured to display in the user interface a selection mechanism, which, when selected, makes a contact to a caller of the selected contact attempt.

7. An arrangement in a subscriber terminal comprising:
receiving means for receiving calls and text messages at the subscriber terminal;

saving means for saving received unanswered call data and saving received text messages;

constituting means for constituting a collection of both received unanswered call data and at least one saved received text message by combining together the unanswered call data and the saved received text messages at the subscriber terminal, which both refer to the same caller, into a single contact attempt related to the caller, wherein content of the at least one saved received text message is descriptive of a reason for the calls, and wherein the constituting means finds a reference to the same caller if both the unanswered call data and the saved received text message both contain the same caller identifier; and presenting means for presenting the single contact attempt comprising the content of the at least one saved received text message to indicate the reason for the calls.

8. The arrangement of claim 7, wherein presenting means displays the contact attempts within a list of contact attempts.

9. The arrangement of claim 8, wherein the presenting means displays the list of contact attempts as a list of callers.

10. The arrangement of claim 7, wherein the presenting means receives a selection regarding the contact attempt and displays the selected contact attempt in more detail.

11. The arrangement of claim 7, wherein the presenting means fetches a name for the caller present in the contact attempt from a phonebook and displays the name of the caller.

12. The arrangement of claim 7, wherein the presenting means displays a selection mechanism, which, when selected, makes a contact to a caller of the selected contact attempt.

13. A method arranged to be implemented in a subscriber terminal comprising:

receiving calls and text messages at the subscriber terminal;

saving received unanswered call data and received text messages;

constituting a collection of both received unanswered call data and at least one saved received text message by combining together the unanswered call data and the saved received text messages at the subscriber terminal, which both refer to the same caller, into a single contact attempt related to the caller, wherein content of the at least one saved received text message is descriptive of a reason for the calls, and wherein a reference to the same caller is found if both the unanswered call data and the saved received text message both contain the same caller identifier; and presenting the single contact attempt comprising the content of the at least one saved received text message to indicate the reason for the calls.

14. The method of claim 13, further comprising: displaying the single contact attempt within a list of contact attempts.

15. The method of claim 14, further comprising: displaying the list of contact attempts as a list of callers.

16. The method of claim 13, further comprising: receiving a selection regarding the contact attempt and displaying the selected contact attempt in more detail.

17. The method of claim 13, further comprising: fetching a name for the caller present in the contact attempt and displaying the name of the caller.

18. The method of claim 13, further comprising: displaying a selection mechanism, which, when selected, makes a contact to a caller of the selected contact attempt.

19. A non-transitory computer program storage medium readable by a computer and encoding a computer program of instructions for executing a computer process for presenting contact attempts to a subscriber terminal of a radio system, the process arranged to be implemented in the subscriber terminal comprising:

saving received unanswered call data and received text messages at the subscriber terminal;

combining together both received unanswered call data and at least one saved received text message, which both refer to the same caller, at the subscriber terminal into a single contact attempt related to the caller, wherein content of the at least one saved received text message is descriptive of a reason for the unanswered call data, and wherein a reference to the same caller is found if both the unanswered call data and the at least one saved received text message both contain the same caller identifier; and presenting, with a user interface of the subscriber terminal, the single contact attempt comprising the content of the at least one saved received text message to indicate the reason for the unanswered call data.

20. The non-transitory computer program storage medium of claim 19, further comprising: displaying the single contact attempt within a list of contact attempts with the user interface.

21. The non-transitory computer program storage medium of claim 20, further comprising: displaying the list of contact attempts as a list of callers with the user interface.

22. The non-transitory computer program storage medium of claim 19, further comprising: receiving a selection regarding the contact attempt and displaying the selected contact attempt in more detail with the user interface.

23. The non-transitory computer program storage medium of claim 19, further comprising: fetching a name for the caller present in the contact attempt and displaying the name of the caller with the user interface.

24. The non-transitory computer program storage medium of claim 19, further comprising: displaying a selection mechanism with the user interface, which, when selected, makes a contact to a caller of the selected contact attempt.

25. The non-transitory computer program storage medium of claim 19, the storage medium comprising a computer readable medium, a record medium, a computer readable memory, a computer readable software distribution package, and a computer readable compressed software package.

* * * * *